United States Patent [19]

Kruger

[11] Patent Number: 4,466,695

[45] Date of Patent: Aug. 21, 1984

[54] ROTARY ANNULAR SIGNAL DATA COUPLER

[75] Inventor: Bradford E. Kruger, Woodland Hills, Calif.

[73] Assignee: International Telephone & Telegraph Corporation, New York, N.Y.

[21] Appl. No.: 319,263

[22] Filed: Nov. 9, 1981

[51] Int. Cl.³ .............................................. G02B 7/26
[52] U.S. Cl. .................................. 350/96.20; 250/227
[58] Field of Search ............... 350/96.15, 96.20, 356; 343/761, 762, 763, 766, 768; 333/261; 250/227

[56] References Cited

U.S. PATENT DOCUMENTS

| | | | |
|---|---|---|---|
| 3,546,699 | 12/1970 | Smith | 343/762 X |
| 4,027,945 | 6/1977 | Iverson | 350/96.20 X |
| 4,107,517 | 8/1978 | Cooper | 250/227 X |
| 4,278,323 | 7/1981 | Waldman | 350/96.20 |

Primary Examiner—John D. Lee
Attorney, Agent, or Firm—T. E. Kristofferson; A. D. Stolzy

[57] ABSTRACT

An electro-optical arrangement for transmitting signal data as modulated light energy across a rotating annular interface. The modulated light beams according to the system are projected axially within an annular cavity and thence outward through a redundant window arrangement. Another annular member rotatable with respect to the first one includes a plurality of closer-spaced but narrower second windows and a light-to-electric transducer associated with each second window. The spacing of the second windows is such that there is always light communication between the first and second window groups. The system is particularly adapted to digital modulation of the light energy.

8 Claims, 5 Drawing Figures

ROTARY ANNULAR SIGNAL DATA COUPLER

BACKGROUND OF THE INVENTION

1. Field of the Invention

The invention relates to electro-optical data transmission systems, and more particularly, to such systems operative across a rotating interface.

2. Description of the Prior Art

A particular problem arises in connection with shipboard, rotating, radar antenna systems, especially in surveillance radar equipment where the antenna may be relatively large and heavy (either of the feed and reflector type or of the multi-element planar array type). A surveillance capability usually requires such an antenna to be rotatably mounted about a vertical or nearly vertical axis in order to obtain 360° coverage. To avoid the blockage resulting from various parts of the ship's own superstructure, is has been necessary to mount the large and heavy antenna array and its drive mechanism as high as possible, even at the very top of a main mast.

In view of the inherent difficulties, associated with placement of a relatively heavy rotating antenna assembly at the top of the mast, it has been more recently suggested that such an antenna assembly might be arranged on a drive which causes it to rotate about a circle outside of the mast, the array normal usually remaining perpendicular to a tangent of the said circle. Stated otherwise, the array normal always coincides with a line containing a radius of the circle. To accommodate radio frequency power exchange between fixed transmitting/receiving components and such an array, various forms of rotating feeds have been suggested. One particularly advantageous feed for the purpose is described in U.S. patent application Ser. No. 040,325, filed May 18, 1979, and entitled "Around-the-Mast Rotary Coupler", now U.S. Pat. No. 4,222,055, assigned to the assignee of the present invention. A variation of this RF feed arrangement is described in U.S. patent application Ser. No. 107,397, filed Dec. 26, 1979, now U.S. Pat. No. 4,253,101, entitled "Power Transfer Ripple Reduction Method and Means for Rotary Annular Loop RF Coupler," also assigned to the assignee of the present invention. Those inventions deal with the problem of RF energy transfer across a rotating interface, whereas the invention herein described deals with control or information signal transfer, preferably in digital code form.

In addition to radio frequency energy transfer, it is frequently necessary to exchange other signals between the rotating antenna structure and fixed transmit/receive components. One particular requirement for additional signal transfer concerns digital signals for the control of digital phase shifters associated with discrete elements of a planar array, or with discrete rows or columns of elements in such a planar array. The most obvious and basic apparatus for effecting such a transfer would be a slip-ring and brush arrangement, or some form of inductive or capacitative coupling between mutually rotatable transfer structures. The disadvantages of slip-ring and brush arrangements are well known, and inductive and capacitative couplers are difficult to implement satisfactorily, particularly when the radius of the circle of array travel about a mast is relatively large.

The manner in which the present invention uniquely solves the aforementioned signal transfer problem will be understood as this description proceeds.

SUMMARY OF THE INVENTION

In view of the disadvantages of the prior art, it may be said to have been the general objective of the present invention to provide a signal coupler which is reliable, relatively inexpensive, light, and tolerant of partial failure of components. The structure of the invention provides an annular rotary signal coupler which can be considered generally adapted to transfer of various forms of signal data between fixed and rotating structures, but is particularly adapted for the transmission of digital signals.

The apparatus of the invention employs modulated light beams as the transmission medium. Fixed and rotating structures provide corresponding fixed and rotating annular cavities. One of these, preferably the fixed cavity, includes at least one, but preferably a plurality of modulated light sources, directing focused beams axially within the fixed cavity. Within the said fixed cavity structure, a window and mirror arrangement is provided for each of the sources. The axial source beams are each redirected radially outward through the corresponding one of these windows in the fixed (stator) assembly.

The rotor assembly comprises a hollow annular enclosure nominally of rectangular cross-section and having M radially inwardly facing windows, each with a light-to-electric transducer associated therewith. The rotor assembly is free to rotate with the antenna assembly about an axis shared with stator annulus. The interface of rotor and stator windows of the same height (measured axially) provides failure-resistance redundancy especially where more than one stator window is provided. If N stator windows circumferentially spaced about the stator annular cavity are provided, and if the stator windows each have a width w and the rotor windows each have a smaller width r, relative geometry can be selected so that an overlap always exists and transmission across the rotor/stator interface continues even if some of the aforementioned transducers fail. The relative window geometry will be more completely described thereinafter.

Paralleling of modulated light stator window signals and rotor transducer outputs is provided as will also be further described thereinafter.

DETAILED DESCRIPTION

Figure 1:
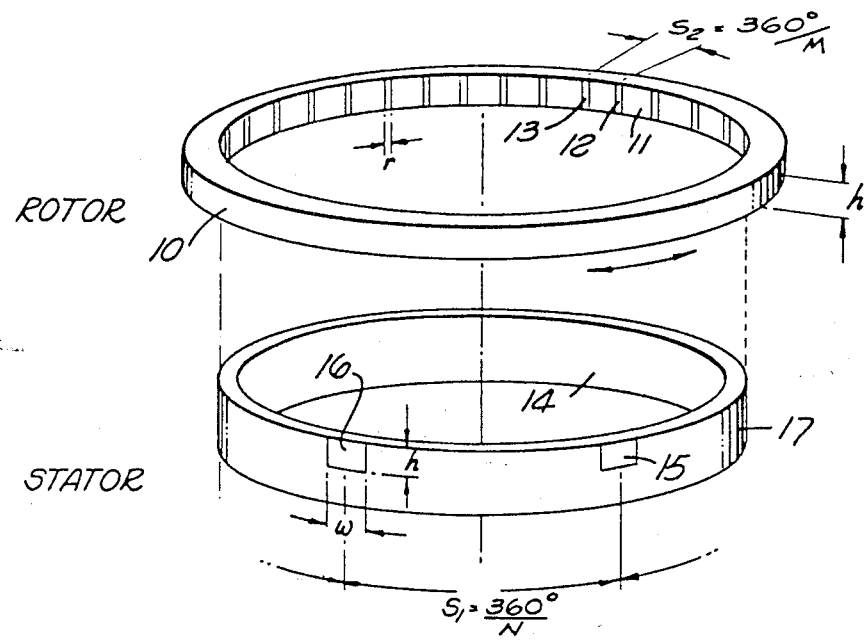
FIG. 1 is an exploded view of a stator and rotor assembly according to the invention.

Referring now to FIG. 1, a stator assembly generally at 17 and a rotor assembly generally at 10 are shown in exploded relationship for clarity. Actually, it will be realized that, in operation, the rotor assembly 10 fits rotatably around the periphery of 17, with its h dimension matching that of the h dimension of the light transmission windows, typically 15 and 16 of the stator 17. The inside surface of the rotor assembly 10 is identified as 11 on FIG. 1 and is divided by a succession of light transmission windows typically 12 and 13. These light transmission windows appear only at the outside surface of stator housing 17 and not on the inside surface 14. However, the converse is true of the rotor assembly 10, namely that the windows appear on the inside surface 11 but not the outside surface of rotor 10.

Figure 2:
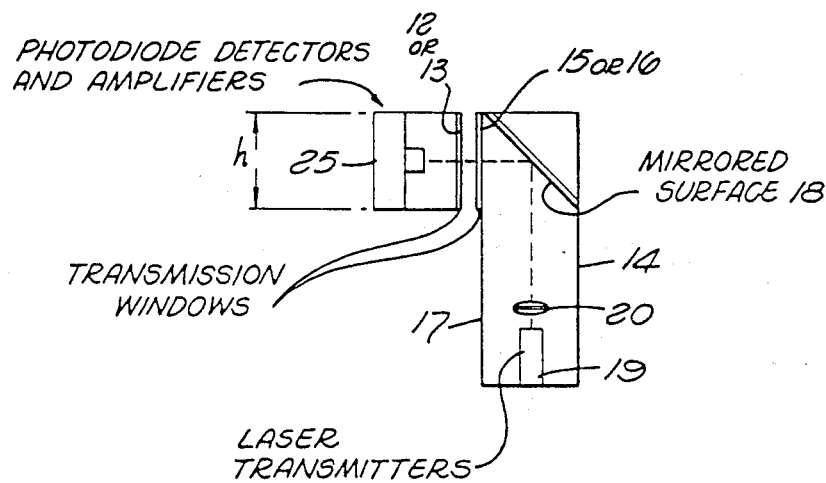
FIG. 2 is a cross-sectional view taken through any of the stator transmission windows according to FIG. 1 but with the rotor ring properly interfaced with the stator.

The stator assembly 17 is actually a hollow annular housing, enclosing an annular-shaped interior space. Substantially the same is true of the rotor assembly 10. Referring now to FIG. 2, its sectional view taken transversely (radially) through one of the aforementioned light transmission windows and the stator assembly 17 is shown. A laser transmitter 19 with lens system 20 directs a modulated light beam axially onto a mirrored surface 18 and thence, radially by reflection to pass through the associated stator light transmission window (15 or 16, for example). This light signal engages and enters any of the rotor windows such as 12 or 13, etc., thereby illuminating each corresponding light-to-electric signal transducer 25.

Figure 3:
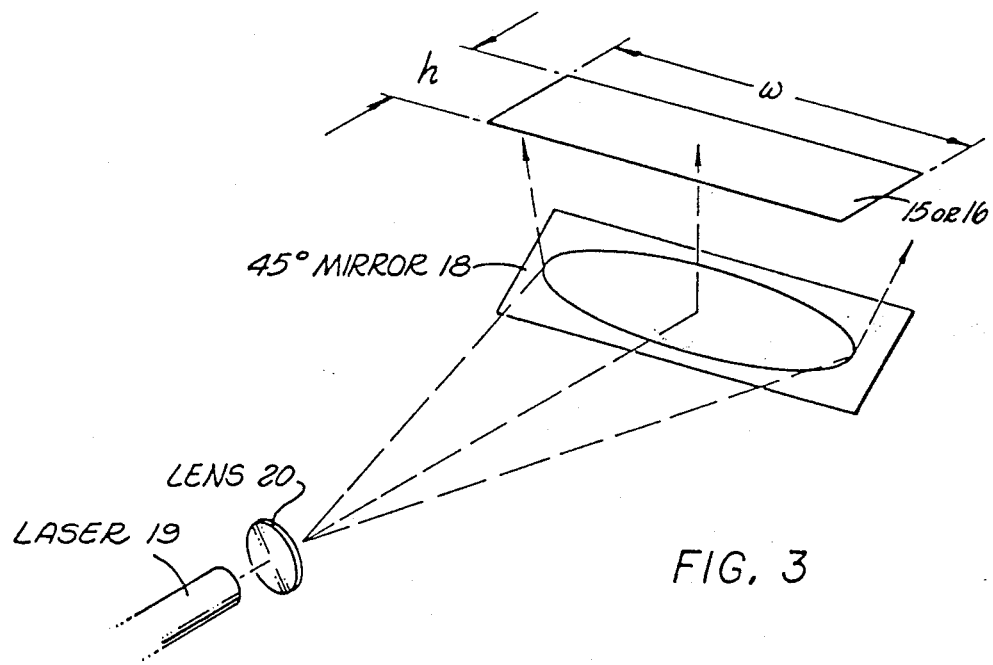
FIG. 3 is a detail of typical stator illumination with a signal-modulated light beam.

It will be noted that each of the stator light transmission windows 15, 16, etc. has a circumferential dimension w and axial height dimension h. FIG. 3 indicates the nature of the lens system 20 is such as to illuminate each corresponding stator light transmission window at least roughly uniformly in a pattern shown on the mirror 18 which, when reflected to the corresponding stator window approximately illuminates the entire window. A generator such as a laser diode at 19 inherently transmits a fan beam of light which is further spread by divergent optics (lens system) at 20.

Figure 5:
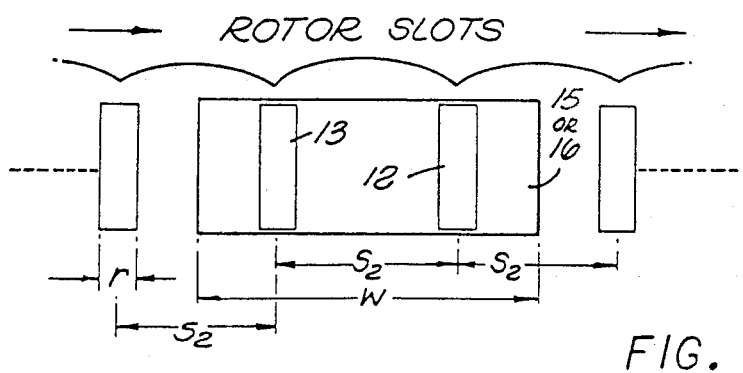
FIG. 5 depicts relative rotor and stator transmission window geometry.

Referring now to FIG. 5, the relative geometry of rotor and stator slots (windows) is depicted. It will be noted that rotor windows have width r and are spaced by a circumferential amount $S_2$, whereas the stator slots are spaced $S_1 = 360/N$ in degrees. The spacing of the rotor slots $S_2$ is made equal to (w-r)/2 so that a stator window always overlaps at least two rotor windows. If there are M rotor windows (slots), then M is obviously $360/S_2$ from these relationships, and the number of rotor windows, each of circumferential width r can be determined. The annular enclosure curved inner and outer perimeter surfaces are referred to hereinafter as axially extending surfaces. Each rotor window, of course, has an associated light-to-electric transducer 25 as depicted in FIG. 2, and each stator window has an associated illuminating source 19 and mirror surface 18. According to the arrangement suggested by FIG. 1, N such stator windows spaced circumferentially by 360°/N are contemplated. Quite obviously a single stator window with associated means for illuminating it with modulated light energy would provide the function desired, except that no redundancy would exist in the event of failure of the illuminating apparatus.

Figure 4:
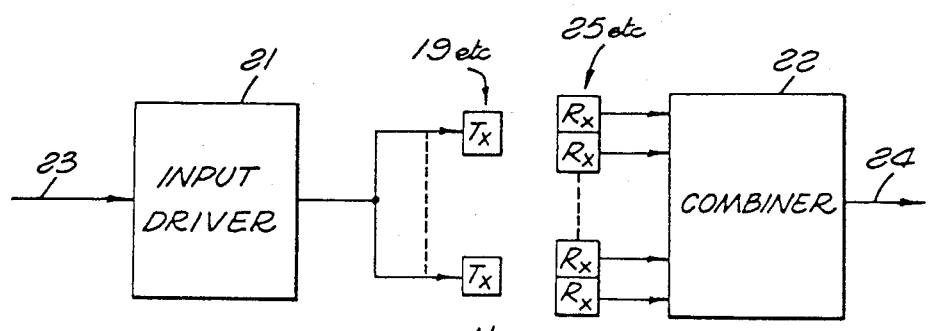
FIG. 4 is a schematic block diagram of a system and electronic components therefor, according to the invention.

Referring now to FIG. 4, a typical arrangement providing the electronic apparatus needed is illustrated. An input driver 21 receives an electrical signal at input 23. This signal may be multiplexed, or may in fact be a plurality of separate signals each representing a desired function to be effected in the antenna or other apparatus rotating with rotor 10. The inherent bandwidth of the optical medium is so high that color, (frequency) or other multiplexing techniques may be employed. Thus, the input driver 21, which includes the appropriate amplification for driving the laser sources 19 may include the desired multiplexing circuits, for example, of the same character well-known and well understood in the fiber optic communication art.

Each of the N transmitting light sources 19 is identified as $T_x$ and each of the M rotor light-to-electric transducers $R_x$ would operate at all times as the rotor assembly 10 turns about the common central axis it shares with the stator assembly. That is, the foregoing assumes N stator windows such as 15 and 16 each with associated source and the relative rotor window geometry depicted in FIG. 5. Finally, the combiner 22 which is receptive to the outputs of all transducers $R_x$ may provide a simple multiple input OR circuit having common output 24, or alternatively, a complexed "voting" scheme might be incorporated in combiner 22 and could be based on some criterion pertinent to a particular electronic radar system with which the combination of the invention is included.

The vertical orientation of the rotor and stator windows minimizes the collection of foreign matter thereon, and obviously the structure could be modified to place the rotor annulus within the stator, in which case stator windows would be on the internal surface and rotor windows would be on the outside surface of the rotor annulus. Still further, the illuminated windows could be in the rotor assembly and the larger number of signal receiving windows could be placed in the stator if this variation were consistent with signal flow considerations.

Suitable materials and components are readily selected by those of skill in the electrical and mechanical arts, there being no requirements not evident herein and no considerations or tolerances. Both the rotor and stator interior annular spaces may be sealed, if operation in a particular hostile environment is contemplated. If such sealing is to employed, both the rotor and stator windows may be fabricated from a suitable glass or transparent material, adhesively or hermetically bonded to the shell of the enclosure.

From the foregoing description, it will be realized that the present invention provides a highly failure-resistent signal data transmission medium for such applications as the aforementioned around-the-mast radar antenna arrangement.

It will be noted that digital signals transferred redundantly from more than one stator window through more than one rotor window arrive at the light-to-electric transducers 25 time synchronously. The result of this synchronism at the output of combiner 22 is that the original transfer is uninterrupted and unaffected by rotor/stator relative angular velocities from zero up to a mechanically achievable maximum. Moreover, the sense of rotor/stator relative rotation has no effect on the operation of the device.

Modifications and variations will, of course, suggest themselves to those of skill in these arts once the invention is understood. Accordingly, it is not intended that the invention should be regarded as limited by the embodiment illustrated in the drawings or described herein.

What is claimed is:
1. A device for effecting signal transfer between fixed first apparatus and rotatable second apparatus, comprising:

first means including a fixed first annular enclosure, said first enclosure comprising a first plurality of first light-transmissive windows each of width W, measured circumferentially, and height h, measured axially, along one axially extending surface of said enclosure;

second means comprising a second annular enclosure substantially concentric with said first enclosure and having a circumferentially and axially extending surface interfaced with said windowed surface of said first enclosure, said second annular enclosure being rotatable about the common axis about which said annular enclosures are concentric;

a plurality of second light transmissive windows in a circumferentially and axially extending wall of said second means, said second means windows having width r and being closely spaced radially with respect to said first means windows to form an optical signal transfer interface;

third means within said first means for generating and directing a light signal through said first means windows, said light signal being modulated in accordance with signal data to be transferred across said interface;

fourth means including light-to-electric transducers arranged to be illuminated through a corresponding number of said second light transmissive windows during interface with said first windows, one of said transducers being provided for each of said second windows, to provide redundant output signals; and fifth means responsive to the transducer outputs of said fourth means for combining said transducer outputs to effect redundancy.

2. Apparatus according to claim 1 in which said first means circumferentially and axially extending surface of said first enclosure is the radially outward annular surface thereof and said second means circumferentially and axially extending surface is the radially inward annular surface thereof.

3. Apparatus according to claim 1 in which the windows of said plurality of second light transmissive windows are each of circumferential width r which is less than W, are spaced $(w-r)/2$ and are uniformly distributed circumferentially about said second means, annular surface, thereby to ensure that not less than two of said second windows interface with each of said first windows at all times.

4. Apparatus according to claim 3 comprising a plurality N of said first light transmissive windows distributed circumferentially about said first annular enclosure, the angular spacing thereof being 360/N, in degrees.

5. Apparatus according to claim 1 comprising a plurality N of said first light transmissive windows provided and distributed circumferentially about said first annular enclosure, the angular spacing thereof being 360/N in degrees.

6. Apparatus according to any of claims 1, 2, 3 and 5 in which said fourth means transducers are photodiodes.

7. Apparatus according to claim 1, in which said third means comprises a separate laser diode illuminating each of said first means windows.

8. A device for effecting signal transfer between fixed first apparatus and rotatable second apparatus, comprising:

first means including a fixed first annular enclosure, said first enclosure comprising a first plurality of first light transmissive windows each of width W, measured circumferentially, and height h, measured axially, along one axially extending surface of said enclosure;

second means comprising a second annular enclosure substantially concentric with said first enclosure and having a circumferentially and axially extending surface interfaced with said windowed surface of said first enclosure, said second annular enclosure being rotatable about the common axis about which said annular enclosures are concentric;

a plurality of second light transmissive windows in a circumferentially and axially extending wall of said second means, said second means windows having width r and being closely spaced radially with respect to said first means windows to form an optical signal transfer interface;

third means within said first means for generating and directing a light signal through said first means windows, said light signal being modulated in accordance with signal data to be transferred across said interface;

fourth means including light-to-electric transducers arranged to be illuminated through a corresponding number of said second light transmissive windows during interface with said first windows, one of said transducers being provided for each of said second windows, to provide redundant output signals; and fifth means responsive to the transducer outputs of said fourth means for combining said transducer outputs to effect redundancy, the windows of said plurality of second light transmissive windows being each of circumferential width r which is less than W, are spaced $w-r/2$ and are uniformly distributed circumferentially about said second means annular surface, thereby to ensure that not less than two of said second windows interface with each of said first windows at all times, a plurality N of said first light transmissive windows distributed circumferentially about said first annular enclosure, the angular spacing thereof being 360/N, in degrees, said third means comprising N light carrier generators and N corresponding modulators therefor responsive to said signal data to illuminate said N first light transmissive windows in substantially the same modulation phase and therefore to provide electrical outputs from said fourth means transducers which are substantially time coincident, said N light carrier generators comprising N corresponding laser diodes mounted to direct their beams axially within said first means enclosure, and in which lens means and a reflective surface are included, to redirect said light signals of said light carrier generators radially to substantially illuminate each of said first means windows.

* * * * *